United States Patent Office 3,462,506
Patented Aug. 19, 1969

3,462,506
SEPARATION OF p-XYLENE FROM A $C_8$ AROMATIC HYDROCARBON MIXTURE BY CRYSTALLIZATION
Stanley Ohlswager, Matteson, and Robert Edison, Olympia Fields, Ill., assignors to Sinclair Research, Inc., New York, N.Y., a corporation of Delaware
No Drawing. Filed May 22, 1967, Ser. No. 640,399
Int. Cl. C07c *15/08, 7/14*
U.S. Cl. 260—674                  10 Claims

ABSTRACT OF THE DISCLOSURE

Paraxylene of at least 99 mol percent purity is separated from a $C_8$ aromatic hydrocarbon mixture in two crystallization stages by cooling the mixture (e.g. to below about −60 to −100° F.) to crystallize substantially only paraxylene which is separated as a cake and washed with toluene (e.g. in an amount of about 0.5 to about 10 moles of toluene per mole of liquid occluded in the separated cake); melting the washed cake containing toluene and cooling the resulting slurry (e.g. at a temperature of about 0 to 40° F.) to recrystallize substantially only the paraxylene which is separated as a cake of less than 99 mol percent purity. The separated cake is then melted and the toluene removed.

---

It has been the practice to separate paraxylene from hydrocarbon mixtures predominating in $C_8$ to $C_{10}$ aromatic hydrocarbons by crystallization since separation of this aromatic hydrocarbon by distillation is generally impractical or uneconomic due to the close proximity of the boiling point of paraxylene to its isomers, especially metaxylene, present in such mixtures. Since the paraxylene to be separated and its $C_8$ isomers reportedly form an eutectic mixture at a certain temperature, crystallization processes have been developed to avert the formation of an eutectic mixture of the desired paraxylene and its close boiling isomers by cooling the mixture just short of the point where the first eutectic of the paraxylene with its accompanying compounds is formed.

Inasmuch a single crystallization produces products having a purity well below 100%, the product is usually recrystallized to increase purity. For obtaining paraxylene of a given purity, the temperature required in the second step is dependent on the dryness of the cake which can be obtained, higher temperatures resulting in greater amounts of paraxylene in the second stage filtrate. One might expect that at least 99 mol percent purity paraxylene, for instance, could be obtained by operating under high enough temperatures in the second stage crystallization to increase the percent of paraxylene in the filtrate. Attainment of 99%+ purity paraxylene under this method has been difficult to achieve as demonstrated in U.S. Patent No. 2,866,833 to Charles A. Spiller. In addition, as the patent points out, increasing the second stage temperature increases the amount of filtrate which must be recycled to the first stage which in turn greatly increases the refrigeration load and centrifuge capacity required in a commercial plant. The patentees alleviated these problems and was able to produce paraxylene of at least 99 mol percent purity by employing yet a third stage recrystallization step. Employment of a third recrystallization step, however, also necessitates additional equipment and utilities and is therefore disadvantageous from a cost standpoint.

It is also conveivable that a product of at least 99 mol percent purity might be obtained by increasing, for instance, the spin time or gravitational force of the second stage centrifuge. These operations have also proved unsatisfactory or inconvenient for increasing the spin time generally still leaves in the cake a residual amount of occluded, relatively impure liquid while the employment of apparatus possessing sufficient gravitational force has been impractical either from a cost or availability standpoint.

It has now been discovered that paraxylene having a mol percent purity of at least 99% can be obtained in a recrystallization purification system with little loss in yield and centrifuge capacity by employing the process of the present invention. In accordance with this process a hydrocarbon feed containing paraxylene is cooled in a first crystallization stage to crystallize substantially only the paraxylene. The crystals are separated as a cake from the bulk of the mother liquor as by centrifugation which cake usually occludes at least about 10% up to a maximum of about 30% by weight of mother liquor. The cake is then washed with toluene in an amount sufficient to provide a paraxylene cake of at least 90 mol percent purity (toluene free), and the resulting washed cake melted and again cooled in a second crystallization stage, this time at a higher temperature, generally at about 0 to 40° F. to recrystallize the paraxylene. Separation, as by centrifugation, produces (1) a second stage filtrate, a portion of which may be recycled to the second stage crystallizer, to control solids content and the remaining portion, after separation of the toluene, for example, by fractional distillation may be recycled to the feed to the first stage crystallizer; and (2) a cake which has a purity of less than 99 mol percent and usually at least about 98 mol percent and which occludes after centrifugation a maximum of about 10% liquid the impurity in which liquid is substantially toluene. The cake is then melted and the toluene removed as by frictional distillation to provide a paraxylene product of at least 99 mol percent purity.

In the process of the invention, the wash operation employing toluene is high efficient in displacing occluded liquid from the first stage cake. The highly efficient wash operation reduces the amount of close boiling impurities which are sent to the second stage. Thus, the major impurity in the product separated in the second crystallization stage is toluene which can be easily removed from the paraxylene cake by, for example, fractional distillation leaving a final produce of the desired 99 or more mol percent purity.

Suitable crystallization feeds for the paraxylene recovery process of the present invention are, for example $C_8$ hydrocarbon fractions, boiling in the range of about 250 to 295° F. and predominating in $C_8$ aromatics, which contain at least about 5% paraxylene, preferably at least about 8%. Typical feeds contain about 10 to 50% or more of the desired product. Commonly a $C_8$ feed contains about 5 to 30% paraxylene, and includes in admixture one or more of the other xylenes, e.g. about 5 to 70% metaxylene, about 5 to 30% orthoxylene, and a minor amount of ethylbenzene. Minor amounts of paraffins and other aromatics may be also present.

The temperature to which the $C_8$ aromatic hydrocarbon feed is cooled in the first stage is that at which essentially only the desired p-xylene is crystallized without its accompanying isomers being crystallized. As a general rule, the aromatic hydrocarbon feed is cooled down to the eutectic temperature, or somewhat higher, of the p-xylene and the first eutectic-forming compound in the mixture, in other words, not below the temperature at which a component other than the desired p-xylene would be solidified. The temperature is dependent upon the particular feed, for instance, amount and nature of the other hydrocarbons or diluents which may be present in the hydrocarbon feed but simple routine cooling tests or analyses on any particular feed are sufficient for determining the temperature to which an initial charge should be cooled to obtain the crystallization of p-xylene without appreciable amounts of eutectics or other components. Ordinarily, the cooling temperature is about −60 to about −100° F.

In the separation of the p-xylene crystals from the mother liquor in the first crystallization stage the separation, e.g. centrifugation, is conducted under conditions that provide a p-xylene cake having a wetness, that is, a residual or occluded liquid content no greater than about 30%, preferably about 10 to 20%, by weight. Depending upon the composition of the $C_8$ aromatic feed, the occluded liquid will usually contain about 7 to 13% by weight p-xylene. Advantageously, the centrifugation is conducted until "equilibrium wetness" is reached, that is, the point at which further liquid cannot be removed from the cake by the given centrifugal force employed, which in most cases places the occluded liquid content within the preferred range recited above. Thus, the centrifuge is run at a rate sufficient to impose a centrifugal force adequate for giving a crystal cake of the desired solids content, within a short period of time. Usually a rate that provides a centrifugal force in the range of about 400 to 1000 times gravity is sufficient. The centrifugation time will vary depending upon the centrifugal force imposed but in most instances falls in the range of at least about 10 seconds usually up to about 60 seconds.

The crystal cake thus obtained is then washed with toluene in an amount sufficient to effect displacement of enough occluded liquid in the cake to provide a p-xylene feed to the second stage of at least 90 or even 95 mol percent (toluene free). Usually the amount of toluene wash employed is at least about 0.5 mole, up to about 10, preferably about 2 to 6, of toluene per mole of occluded cake liquid. Care should be taken, however, in the use of overly large amounts of toluene since such amounts may cause undue dissolution of the p-xylene cake. The temperature of the toluene wash may be from about the temperature of the crystal cake or lower to about 110° F. The lower wash temperatures may reduce paraxylene loss to the wash liquid but has the attendant disadvantage of increased cooling costs. Temperatures of the order of about 0° to 10° F. have been found to be especially useful when large amounts of toluene are employed.

In the second stage crystallization step, the washed paraxylene cake containing toluene is melted and crystallized at a temperature higher than the temperature employed in the first crystallization operation. Generally the crystallization temperature in the second stage is about 0 to 40° F. Employment of a cooling temperature above about 40° F. results in yield loss and increases the amount of filtrate recycled to the first stage. Cooling to a temperature below about 0° F., on the other hand, curtails the drainage rate of the occluded liquid in the cake and is disadvantageous from the standpoint of the size of crystals formed.

The crystals obtained in the second stage crystallization step are separated by, for example, centrifugation employing essentially the same conditions used in connection with the first stage centrifuge. The occluded impurity in the resulting second stage cake is essentially toluene and can be separated by, for example, fractional distillation to provide a paraxylene product of at least 99 mol percent.

The following examples are included to further illustrate the present invention but are not to be considered limiting.

EXAMPLE I 100 moles per minute of a $C_8$ aromatic hydrocarbon fraction boiling in the range of about 275 to 295° F. and containing 20 mol percent paraxylene, 10 mol percent orthoxylene, 60 mol percent metaxylene and 10 mol percent ethylbenzene is combined with 4.51 moles per minute of filtrate recycled from a second stage centrifuge and charged to a crystallization unit. The feed is cooled to about −79.2° F. in a first stage crystallizer and the resulting slurry of paraxylene crystals and mother liquor is then transferred to the first stage centrifuge where a yield of impure cake is separated from the mother liquor by centrifugal filtration. The mother liquor (88.95 moles per minute) is withdrawn from the centrifuge and yielded as filtrate product. The cake, which accumulated on the centrifuge basket screen is unloaded from the basket by a knife dropped into a melt tank where it is melted.

The melt is recrystallized by cooling in the second stage crystallizer to about 25° F., and the resulting slurry of paraxylene crystals and mother liquor transferred to the second stage centrifuge. The mother liquor separated from the crystals is recycled to the first stage. The second stage cake is melted yielding 11.05 moles per minute of a paraxylene product having a purity of 98.55%.

EXAMPLE II 100 moles per minute of a $C_8$ aromatic hydrocarbon fraction boiling in the range of about 275 to 295° F. and containing 20 mol percent paraxylene, 10 mol percent orthoxylene, 60 mol percent metaxylene, and 10 mol percent ethylbenzene is combined with 3.21 moles per minute of essentially toluene-free filtrate recycled from a second stage centrifuge and charged to a crystallization unit. The feed is cooled to about −79.2° F. in a first stage crystallizer and the resulting slurry of paraxylene crystals and mother liquor is then transferred to the first stage centrifuge where a yield of impure cake is separated from the mother liquor by centrifugal filtration. The mother liquor (87.25 moles per minute) is withdrawn from the centrifuge and yielded as filtrate product. The cake, which accumulated on the centrifuge basket screen, occluded liquor to the extent that the cake consisted of 87% solids and 13% liquids. The solids portion of the cake is 100% paraxylene. The cake is then washed with 5 moles of toluene at a temperature of about 9° F. The amount of toluene employed is 2.40 moles of toluene per mole of occluded liquid in the cake. The cake is unloaded from the basket by a knife and dropped into a melt tank where it is melted. The purity of this melt is 87.3% paraxylene.

The melt is recrystallized by cooling in the second stage crystallizer to about 25° F., and the resulting slurry of paraxylene crystals and mother liquor transferred to the second stage centrifuge. The mother liquor (4.82 moles per minute), separated from the crystals is subjected to fractional distillation to remove toluene and the resulting bottom product (3.21 moles per minute) is recycled to the first stage. The second stage cake is melted and after removal of toluene by fractional distillation 10.26 moles per minute of a paraxylene product having a purity of 99.9% is obtained.

The method of the invention is illustrated in Example II. A comparison of the results obtained in Examples I and II demonstrates that paraxylene of the desired 99 or more mol percent purity can be obtained by employing the method of the invention.

It is claimed:

1. In a purification process for separating paraxylene from an aromatic hydrocarbon fraction predominating in $C_8$ aromatics, including metaxylene and containing at least about 5% paraxylene, the steps comprising cooling the fraction in a first crystallization zone to crystallize substantially only paraxylene, separating paraxylene crystals as a cake from the bulk of the mother liquor by centrifugation, washing the separated cake with toluene in an amount sufficient to provide a paraxylene cake of at least 90 mol percent purity on a toluene-free basis, melting the toluene-containing cake and recrystallizing in a second crystallization zone, at a temperature which is higher than the temperature in the first crystallization zone, substantially only the paraxylene, subjecting the resulting slurry of paraxylene crystals to a second centrifugation to separate a cake of paraxylene containing toluene and removing the toluene to provide a paraxylene product of at least 99 mol percent purity.

2. The method of claim 1 wherein the first cooling operation is conducted at a temperature of below about −60° F. to about −100° F.

3. The method of claim 2 wherein the recrystallization in the second crystallization zone is conducted at a temperature of about 0 to 40° F.

4. The method of claim 1 wherein the amount of toluene employed in the toluene wash is about 0.5 to about 10 moles of toluene per mole of liquid occluded in the first stage cake.

5. The method of claim 4 wherein the temperature of the toluene wash is from about the temperature of the cake separated in the first crystallization zone to 110° F.

6. The method of claim 2 wherein the filtrate separated from the cake of paraxylene by the second centrifugation is fractionally distilled to remove toluene and recycled to the first crystallization zone.

7. In a purification process for separating paraxylene of at least 99 mol percent from a $C_8$ aromatic hydrocarbon feed containing about 8 to 30% paraxylene in admixture with other $C_8$ xylene isomers and ethylbenzene, the steps comprising cooling the feeding in a first crystallization zone to crystallize substantially only the paraxylene, separating paraxylene crystals as a cake from the bulk of the mother liquor by centrifugation, washing the cake with toluene in an amount of about 2 to 6 moles of toluene per mole of occluded liquid in the cake, melting the cake and recrystallizing in a second crystallization zone substantially only the paraxylene at a temperature of about 0–40° F. and higher than the temperature employed in the first crystallization zone, subjecting the resulting slurry of paraxylene crystals and mother liquor to a second centrifugation to separate a cake of paraxylene crystals containing toluene, melting the cake and removing the toluene by fractional distillation.

8. The method of claim 7 wherein the first cooling operation is conducted at a temperature of below about −60° F. to about −100° F.

9. The method of claim 8 wherein the temperature of the toluene is about 0 to 110° F.

10. The method of claim 7 wherein the filtrate separated from the cake of paraxylene by the second centrifugation is fractionally distilled to remove toluene and recycled to the first crystallization zone.

References Cited

UNITED STATES PATENTS 2,795,634  6/1957  Hoff et al. _____ 260—674

FOREIGN PATENTS 571,632  3/1959  Canada.
949,161  2/1964  Great Britain.

DELBERT E. GANTZ, Primary Examiner

C. R. DAVIS, Assistant Examiner